(12) United States Patent
Veksland et al.

(10) Patent No.: US 8,118,227 B2
(45) Date of Patent: Feb. 21, 2012

(54) MULTIPLE CAMERA IMAGING-BASED BAR CODE READER WITH OPTIMIZED IMAGING FIELD

(75) Inventors: Michael Veksland, Mount Laurel, NJ (US); Igor Vinogradov, Oakdale, NY (US); Heng Zhang, Selden, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 165 days.

(21) Appl. No.: 12/627,519

(22) Filed: Nov. 30, 2009

(65) Prior Publication Data

US 2011/0127333 A1  Jun. 2, 2011

(51) Int. Cl.
*G06K 7/10* (2006.01)
(52) U.S. Cl. .............................. 235/462.24; 235/462.32
(58) Field of Classification Search ............. 235/462.24, 235/462.25, 462.32, 462.37–43
See application file for complete search history.

(56) References Cited

U.S. PATENT DOCUMENTS

| | | | |
|---|---|---|---|
| 2001/0042789 A1* | 11/2001 | Krichever et al. | 235/462.14 |
| 2003/0146282 A1* | 8/2003 | Tsikos et al. | 235/454 |
| 2009/0020611 A1* | 1/2009 | Sackett et al. | 235/462.08 |
| 2009/0026271 A1* | 1/2009 | Drzymala et al. | 235/462.42 |

* cited by examiner

*Primary Examiner* — Daniel St. Cyr

(57) ABSTRACT

A multicamera imaging-based bar code reader wherein for least one camera assembly of the reader, a sensor array of the camera assembly is non-orthogonal with respect to an optical axis of an imaging lens assembly of the camera assembly such that an imaging or scanning volume of the camera assembly more closely conforms to a desired imaging field or region of the reader. In one exemplary embodiment the reader features: a housing supporting first and second transparent presentation windows and defining an interior region; an imaging system including a plurality of camera assemblies within the interior region, at least one camera assembly includes a sensor array and an imaging lens assembly, the sensor array being positioned with respect to the imaging lens assembly at an angle so as to be non-orthogonal with respect to an optical axis of the imaging lens assembly of the camera assembly.

20 Claims, 7 Drawing Sheets

MULTIPLE CAMERA IMAGING-BASED BAR CODE READER WITH OPTIMIZED IMAGING FIELD

TECHNICAL FIELD

The present invention relates to a multiple camera or multicamera imaging-based bar code reader and, more particularly, to a multicamera imaging-based bar code reader having first and second substantially orthogonal presentation windows wherein for at least one camera assembly of the reader, a sensor array of the camera assembly is non-orthogonal with an optical axis of an imaging lens assembly of the camera assembly such that an imaging or scanning volume of the camera assembly more closely conforms to a desired imaging field or region of the reader.

BACKGROUND

Various electro-optical systems have been developed for reading optical indicia, such as bar codes. A bar code is a coded pattern of graphical indicia comprised of a series of bars and spaces of varying widths, the bars and spaces having differing light reflecting characteristics. The pattern of the bars and spaces encode information. Bar code may be one dimensional (e.g., UPC bar code) or two dimensional (e.g., DataMatrix bar code). Systems that read, that is, image and decode bar codes employing imaging camera systems are typically referred to as imaging-based bar code readers or bar code scanners.

Imaging-based bar code readers may be portable or stationary. A portable bar code reader is one that is adapted to be held in a user's hand and moved with respect to a target indicia, such as a target bar code, to be read, that is, imaged and decoded. Stationary bar code readers are mounted in a fixed position, for example, relative to a point-of-sales counter. The bar code reader is installed behind one or more transparent windows in a housing which may be integrated into the counter. Target objects, e.g., a product package that includes a target bar code, are presented to one of the one or more transparent windows and thereby pass within a field of view of the stationary bar code readers. The bar code reader typically provides an audible and/or visual signal to indicate the target bar code has been successfully imaged and decoded.

A typical example where a stationary imaging-based bar code reader would be utilized includes a point of sale counter/cash register where customers pay for their purchases. The reader is typically enclosed in a housing that is integral to the counter and normally includes a vertically oriented transparent presentation window and a horizontally oriented transparent presentation window, either of which may be used for reading the target bar code affixed to the target object, i.e., the product or product packaging for the product having the target bar code imprinted or affixed to it. The sales person (or customer in the case of self-service check out) sequentially presents each target object's bar code either to the vertically oriented window or the horizontally oriented window, whichever is more convenient given the specific size and shape of the target object and the position of the bar code on the target object.

A stationary imaging-based bar code reader that comprises a plurality of imaging cameras assemblies or systems is sometimes referred to as a bioptic or multicamera imaging-based scanner or bar code reader. In a multicamera imaging reader, a plurality of imaging camera assemblies are positioned within an interior region of a housing. The housing also supports a plurality of transparent, presentation windows. Fold mirrors are appropriately positioned within the housing interior region to direct a field of view of one or more camera assemblies such that an imaging or scanning volume of the camera more closely conforms to a desired imaging field, region or volume of the reader.

While the fields of view of two or more camera assemblies may overlap to some degree, the effective or total imaging region or imaging volume of the reader is increased by adding additional camera systems. Hence, by virtue of having a plurality of imaging camera assemblies and appropriately positioned fold minors in the housing interior region, a multicamera reader will generally have a multidirectional effective total imaging region compared to single camera imaging bar code reader which requires presentation of a target bar code to the reader in a very limited orientation to obtain a successful, decodable image, that is, an image of the target bar code that is decodable.

As previously mentioned, the camera systems of a multicamera imaging reader includes a plurality of imaging cameras assemblies and a plurality of fold minors disposed within the reader housing and positioned with respect to the transparent presentation windows such that when a target object is presented to the housing presentation windows for reading the target bar code on the target object, the target object is imaged by the plurality of imaging camera assemblies, each camera assembly providing a different image of the target object. For example, one camera assembly may image a top view of the target object, another camera may image a bottom view of the target object, yet another camera assembly may image a first side of the target object. Depending on the position of the camera assemblies within the housing and the size of the target object being imaged, it is possible for a small target object, e.g., a small six sided box containing a bottle of aspirin, that all six sides of the target object may be imaged. Thus, it is also clear that increasing the number of camera assemblies increases the ability to image a target bar code on a target object and provides greater flexibility as to how the target object may be oriented or presented to the housing or the transparent presentation windows while still achieving at least one decodable image.

Each camera assembly of a multicamera imaging-based bar code reader is characterized by an imaging or scanning volume, that is, a region or volume wherein if a target bar code of a given density is presented within the region, a sufficient sharp image of the target bar code will be projected onto a sensor array of the camera assembly by the imaging lens assembly such that the imaged target bar code can successfully be decoded by a decoder. Or, if the reader is used for imaging, i.e., imaging a signature, the region or volume of the camera assembly wherein, if a signature is presented within the region, a sufficiently sharp image of the signature will be projected onto the sensor array of the camera assembly by the imaging lens assembly for the desired purposes of imaging, for example, verification of the signature.

The imaging or scanning volume is determined by the characteristics of the sensor array and the imaging lens assembly. Depending on the position of the camera assembly within the housing, whether or fold mirror is used, the idea is to have the imaging or scanning volume, to as great a degree as possible, to be within the desired imaging field of the reader. It is also desired, that for all camera assemblies taken together, the effective or combined total imaging field of the reader, that is, when all scanning volumes are combined, is as close as possible to including an entirety of the desired imaging field of the reader and is multidirectional, that is, successful imaging can occur in any direction or orientation with the total imaging field of the reader.

In a multicamera imaging-based bar code reader with a horizontal presentation window and an orthogonal presentation window, it is desired to be able to read a target bar positioned adjacent either presentation window, even if the target bar code is oriented facing away from the presentation window. For example, if an object is presented to the horizontal presentation window and the target bar code is facing upwardly, that is, away from the presentation window, it will often times be the case that an effective imaging region or scanning volume of the camera assembly positioned to image a portion of a target object facing away from the presentation window is insufficient to read the target bar code. One reason for this insufficiency is that the scanning volumes of conventional camera assemblies are symmetric with respect to the optical axis of the camera imaging lens assembly, that is, a working range or depth of field of a camera assembly is limited uniformly over the field of view of the camera.

While a symmetric scanning volume may be appropriate for a camera assembly whose field of view is not intersected and directed by a fold mirror, for a camera assembly whose field of view is directed though a presentation window by the use of a fold mirror, a symmetric scanning volume may not comport with the desired imaging field of the reader. Additionally, even if the scanning volume for a particular camera assembly whose field of view is directed by a fold mirror is within the desired imaging field of the reader, the scanning volume for that camera assembly may be less than optimal. For example, there may be a peripheral portion or region of the desired imaging field which is not covered by the fields of view of any other camera assemblies of the reader. It would be desired to have the particular camera assembly cover that peripheral portion of the desired imaging field. However, because of the symmetric scanning volume of the camera assembly, it cannot cover the peripheral portion of the desired imaging field.

What is needed is a multicamera imaging-based bar code reader wherein the scanning volumes of individual camera assemblies are optimized to provide an effective or combined total imaging field or volume of the camera assemblies to more closely comport to a desired imaging field or volume of the reader. What is also needed is a multicamera imaging-based bar code reader with the ability to read target bar codes positioned adjacent to, but facing away from either the horizontal or vertical presentation windows.

SUMMARY

One example embodiment of the present disclosure includes a multicamera imaging-based bar code reader for imaging a target bar code, the bar code reader comprising: a housing supporting first and second transparent presentation windows, the housing defining an interior region; an imaging system including a plurality of camera assemblies coupled to an image processing system, each camera assembly of the plurality of camera assemblies being positioned within the housing interior region and defining a field of view; a fold minor positioned in the housing interior region to intersect and direct a field of view of a camera assembly of the plurality of camera assemblies to pass through the first presentation window; and wherein the camera assembly includes a sensor array and an imaging lens assembly, the sensor array being positioned with respect to the imaging lens assembly so as to be non-orthogonal with respect to an optical axis of the imaging lens assembly of the camera assembly such that a scanning volume of the camera assembly is non-symmetric with respect to the optical axis.

Another example embodiment of the present disclosure includes: an imaging system for use in multicamera imaging-based bar code reader having a housing supporting first and second transparent presentation windows and the housing defining an interior region, a target object being presented to the plurality of windows for imaging a target bar code, the imaging system comprising: a plurality of camera assemblies coupled to an image processing system, each camera assembly of the plurality of camera assemblies being positioned within the housing interior region and defining a field of view; a fold mirror positioned in the housing interior region to intersect and direct a field of view of a camera assembly of the plurality of camera assemblies to pass through the first presentation window; wherein the camera assembly includes a sensor array and an imaging lens assembly, the sensor array being positioned with respect to the imaging lens assembly so as to be non-orthogonal with respect to an optical axis of the imaging lens assembly of the camera assembly such that a scanning volume of the camera assembly is non-symmetric with respect to the optical axis.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

The present disclosure relates to a multicamera imaging-based bar code reader for reading, that is, imaging and decoding, target bar codes. In particular, the present disclosure teaches a system, apparatus, and method for optimizing target bar code reading ability by providing a multicamera imaging-based bar code reader having a plurality of imaging camera assemblies which, in combination, provide an overall or effective imaging field or imaging volume which is substantially encompasses a desired imaging field of the reader. Advantageously, for at least one camera assembly of the reader, a sensor array of the camera assembly is non-orthogonal with an optical axis of an imaging lens assembly of the camera assembly such that an imaging or scanning volume of the camera assembly is non-symmetric with respect to the optical axis of the imaging lens assembly resulting in a scanning volume for the camera assembly that includes either: 1) a greater portion of the desired depth of focus or field of view of the reader than would be case if the sensor array and optical axis were orthogonal and the scanning volume were symmetric with respect to the optical axis; and/or 2) provides imaging coverage of a portion or region of the desired imaging field that otherwise would not be imaged if the scanning volume of the camera assembly was symmetric with respect to the optical axis. Additionally, use of at least one non-orthogonal camera assembly in the reader improves the document capturing capabilities of the reader.

Figure 1:
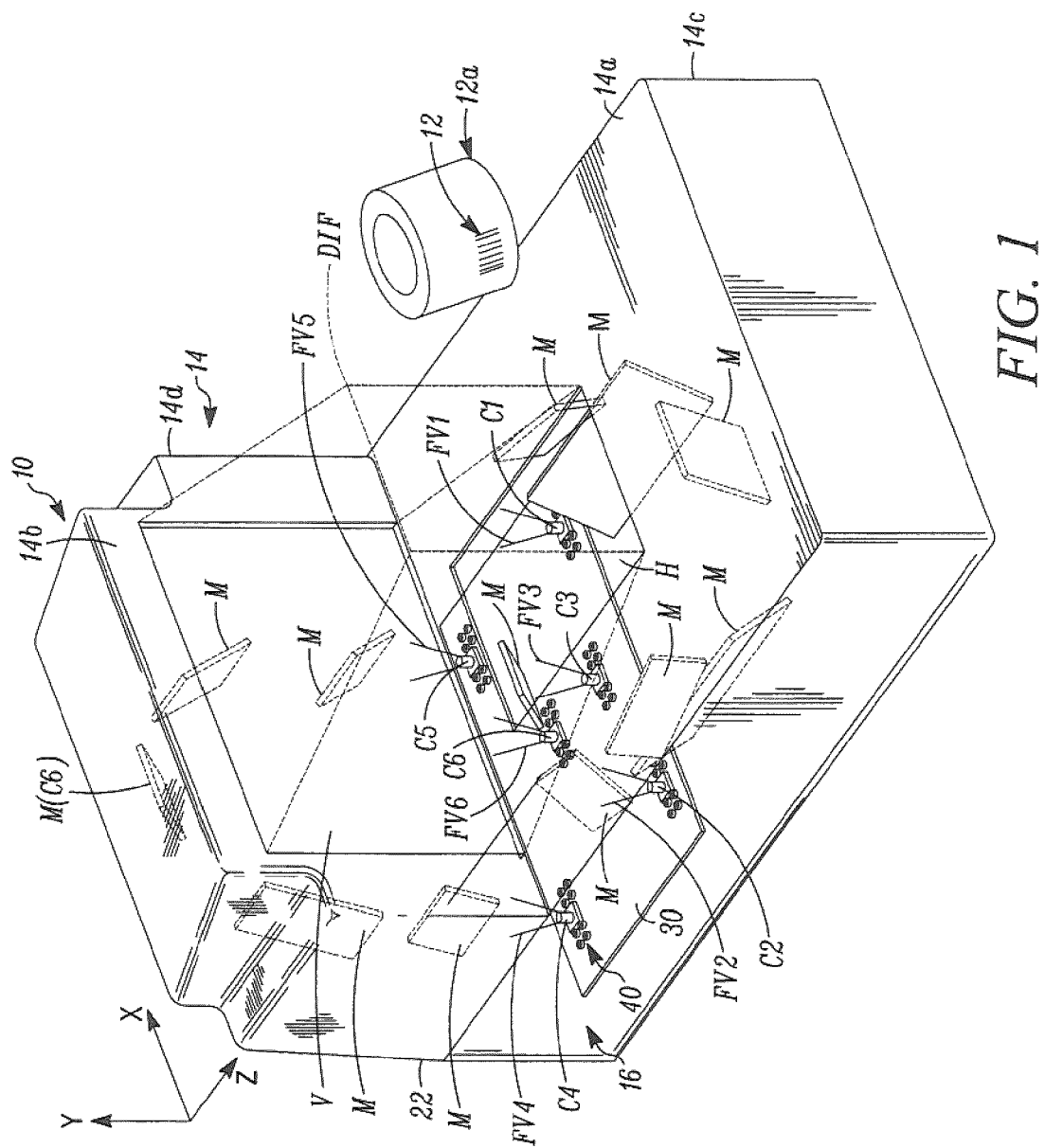
FIG. 1 is a schematic perspective view of an exemplary embodiment of a multicamera imaging-based bar code reader of the present disclosure.

With reference now to the Figures, and in particular with reference to FIG. 1, there is depicted generally at 10 an exemplary embodiment of a multicamera imaging-based bar code reader of the present disclosure for imaging and decoding encoded optical indicia. The reader 10 is capable of reading, that is, imaging and decoding optical, encoded indicia such as target bar codes 12 including one dimensional bar codes (e.g., UPC bar code) and/or two dimensional bar codes (e.g., DataMatrix bar code) and/or postal codes. The reader 10 is also capable of capturing images, for example, imaging signatures.

In the illustrated embodiment of FIG. 1, the reader 10 is a presentation imaging scanner or bi-optic imaging scanner that may, for example, be integrated into a sales counter of a point-of-sales system that includes, for example, a cash register, a touch screen visual display or other type user interface and a printer for generating sales receipts (not shown). The multi-imaging scanner 12 includes a generally L-shaped housing 14 that supports a plurality of transparent, presentation windows.

In one exemplary embodiment, the presentation window include a horizontal presentation window H supported in an upper horizontal surface 14a of a base portion 14c the housing 14 and a vertical presentation window V supported in a forward facing vertical surface 14b of an upright portion 14d of the housing 14. Forward facing is with respect to the direction z in the coordinate axis shown in FIG. 1. The terms vertical, horizontal, forward-facing, etc. are understood to be relative position terms named with respect to the arbitrary x, y, z coordinate axis shown in FIG. 1 and the use of such relative positional terms are further understood not to in any way limit the scope of the present disclosure or the claims appended hereto.

In the illustrated exemplary embodiment, the reader 10 is stationary and an imaging system 15, which includes imaging and decoding systems, are supported within an interior region 16 of the housing 14. When operational, the reader imaging system 15 will image target objects, such as target object 12a, as the object is moved toward the windows H, V by a user. If the target object 12a include a target bar code 12, the imaging system 15 will attempt to read the target bar code 12, that is, the imaging system 15 will analyze one or more captured images of the target object 12a, identify an image of the target bar code 12 within one or more captured images, and attempt to decode the imaged target bar code.

Figure 2:
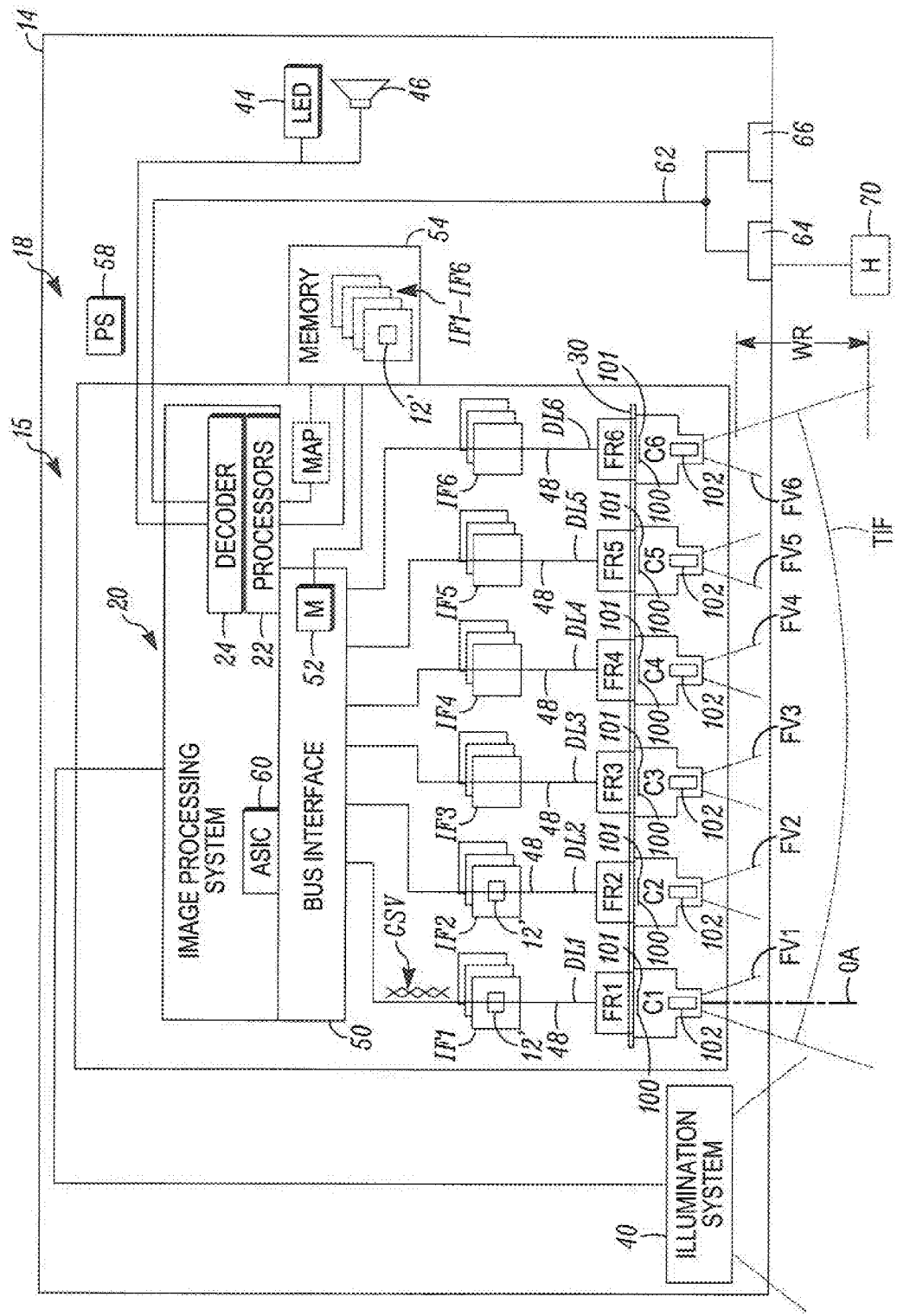
FIG. 2 is a schematic block diagram of selected systems and electrical circuitry of the bar code reader of FIG. 1.

FIG. 2 is a schematic block diagram of selected systems and electrical circuitry 18 of the reader 10, including the imaging system 15. The imaging system 15 includes a plurality of imaging cameras C1, C2, C3, C4, C5, C6, which produce raw gray scale images. The imaging system 15 also includes an image processing system 20, which includes one or more processors 22 and a decoder 24 that analyzes the gray scale images from the cameras and decodes imaged target bar codes 12, if present. The above processors 22 and decoder 24 may be integrated into the reader 10 or may be a separate system, as would be understood by one of skill in the art.

In one exemplary embodiment, there are a plurality of camera assemblies C1-C6 (generally referred to as "C") which are mounted to a printed circuit board 30 (shown in FIG. 1 and schematically in FIG. 2) inside the housing 14 and each camera assembly C defines a two dimensional field-of-view FV1, FV2, FV3, FV4, FV5, FV6 (shown schematically in FIGS. 1 & 2 and generally referred to as "FV"). Positioned behind and adjacent to the presentation windows H, V are a plurality of reflective or fold minors M that are positioned to direct the fields of view FV of the camera assemblies C such that the fields of view exit the housing 14 through one of the presentation windows H, V. By way of example, for camera assembly C6, the field of view FV5 is directed upwardly within the upright portion 14d of the housing 14 due to the position and orientation of the camera assembly C6 on the PC board 30. The field of view FV5 of the camera assembly C5 is intersected and directed by the fold mirror M(C6) through the vertical presentation window V. A detailed explanation of the positioning and directing of the camera assembly fields of view utilizing a plurality of fold minors to generate an effective field of view or scan region is found in U.S. Ser. No. 12/168,347 to Barkan filed Jul. 7, 2008 and entitled "Multi-Imaging Scanner for Reading Images" ("the '347 application"). The '347 application is assigned to the assignee of the present application and the '347 application is hereby incorporated herein in its entirety by reference for any and all purposes.

As can best be seen in FIGS. 3, 3A, 5 and 5A, each of the camera assemblies C is characterized by a working range WR within the field of view FV of the camera assembly. The working range WR for a camera assembly C is characterized by a near distance ND and a far distance FD between which a target bar code 12 of a given size and density brought within the field of view FV of the camera assembly C will be successfully read, that is, imaged and decoded. Because the field of view FV of a camera assembly C is two dimensional (best seen in FIGS. 3A and 5A), the working range WR and the field of view FV together define a volume or depth of field within which a target bar code of a given size and density may be successfully read. The volume or depth of field will herein be referred to as the scanning volume SV of the camera assembly C.

It should be noted, of course, that the exact scanning volume SV of a camera assembly C is not an absolute volume because the ability to image and decode a target bar code is dependent upon, as noted above, the size of the bar code, the density of the bar code, the lighting conditions, the reflective nature of the bar code printing and the substrate or background, etc. Thus, the scanning volume SV of a given camera assembly C will change somewhat depending on these factors and others. The collective scanning volumes SV of the camera assemblies C define an imaging system total effective imaging field or region TIF above the horizontal window H and forward of the vertical window V within which a target bar code 12 presented for reading may be successfully imaged and decoded. The total effective imaging field TIF is shown schematically in FIG. 2 as the combination of individual camera fields of view F1-F6 over the respective working range WR of each camera. Or, if the reader 10 is used for imaging, i.e., imaging a signature, the total effective imaging field TIF is a region or volume wherein if a signature of a given size and clarity is presented within the region, a sufficiently sharp image of the signature will be projected onto a sensor array of the camera assembly by the imaging lens assembly for the desired purposes of the imaging, for example, verification of the signature.

It is unknown how a particular user of the reader 10 will present a target object 12a with a target bar code 12 for reading. Generally, a user will assume that presentation of a target object anywhere in a region above the horizontal window H and forward of the vertical window V is sufficient to have the target bar code 12 successfully read. This is especially true in readers 10 that are used as part of self-serve check out sales registers such as those found at grocery stores and big box home improvement stores where consumers use present items to be purchased to the reader. In such situations, an untrained consumer purchasing bulky and/or heavy items is unlikely to be careful to orient items properly to present the target bar code 12 to either of the presentation windows H, V. Accordingly, a desired imaging field or desired depth of focus DIF for the reader would include the entirety of a region above the horizontal window H and forward of the vertical window V. The horizontal and vertical presentation windows H, V, bound the desired imaging field DIF. The desired imaging field DIF is shown schematically in dashed line in FIG. 1. It is desired that a target bar code 12 presented for reading and positioned in any orientation within the desired imaging field DIF would be successfully imaged and decoded.

Advantageously, as will be discussed below, the reader 10 of the present disclosure utilizes one or more camera assemblies wherein the scanning volume SV of the camera assembly is non-symmetric with respect to an optical axis of the camera assembly thereby resulting in the effective imaging field or region or volume TIF of the camera assemblies C encompassing a greater portion of the desired imaging field or region or volume DIF of the reader 10 than would be possible if all of the camera assemblies were conventional camera assemblies wherein an imaging lens assembly of the camera assembly is orthogonal to the sensor array and a scanning volume SV of the camera assembly is symmetric with the optical axis of the camera assembly.

Each camera assembly C1-C6 of the imaging system 15 captures a series of image frames of its respective field of view FV1-FV6. A series of image frames for each camera assembly C1-C6 is shown schematically as IF1, IF2, IF3, IF4, IF5, IF6 in FIG. 2. Each series of image frames IF1-IF6 comprises a sequence of individual image frames generated by the respective cameras C1-C6. As seen in FIG. 2, the designation IF1, for example, represents multiple successive images obtained from the camera C1. As is conventional with imaging cameras, the image frames IF1-IF6 are in the form of respective digital signals representative of raw gray scale values generated by each of the camera assembly C1-C6.

Optionally, an illumination system 40 is provided in the form of one or more high energy light emitting diodes (LEDs) for each camera assembly C. As can best be seen in FIG. 1, the LEDs may be surface mount LEDs mounted on the PC board 30. In an alternative embodiment (not shown), the illumination system 42 may comprise cold cathode fluorescent lamps (CCFLs) or a combination of LEDs and CCFLs.

In the exemplary embodiment, the multi-imaging reader 10 reads target bar codes 12 moving through the effective total imaging field TIF with a speed of approximately 100 inches per second, and images the target bar code regardless of its orientation with respect to the windows V, H. In accordance with one use, either a sales person or a customer will present a product or container 12a selected for purchase to the housing 14. More particularly, a target bar code 12 imprinted or affixed to the product or product's container 12a will be presented in a region near the windows H, V into the effective total imaging field TIF for reading, that is, imaging and decoding of the coded indicia of the target bar code. Upon a successful reading of the target bar code 12, a visual and/or audible signal will be generated by the reader 10 to indicate to the user that the target bar code 12 has been successfully imaged and decoded. The successful read indication may be in the form of illumination of a light emitting diode (LED) 44 and/or generation of an audible sound by a speaker 46 upon generation of an appropriate signal from the decoder 24.

The image processor or processors 22 of the imaging system 15 controls operation of the cameras C1-C6. The cameras C1-C6, when operated during an imaging session, generate digital signals 48. The signals 48 are raw, digitized gray scale values which correspond to a series of generated image frames for each camera. For example, for the camera C1, the signal 48 corresponds to digitized gray scale values corresponding to a series of image frames IF1. For the camera C2, the signal 48 corresponds to digitized gray scale values corresponding to a series of image frame IF2, and so on. The digital signals 48 are coupled to a bus interface 50, where the signals are multiplexed by a multiplexer 52 and then communicated to a memory 54 in an organized fashion so that the processor knows which image representation belong to a given camera.

The image processors 22 access the image frames IF1-IF6 from memory 44 and search for image frames that include an imaged target object 14'. If the imaged target object 14' is present and decodable in one or more image frames, the decoder 30 attempts to decode the imaged target object 14' using one or more of the image frames having the imaged target 14' or a portion thereof.

Each camera assembly C includes a sensor array 100 in the form of a charged coupled device ("CCD"), a complementary metal oxide semiconductor ("CMOS"), or other imaging pixel array, operating under the control of the imaging processing system 26. In one exemplary embodiment, the sensor array 100 comprises a two dimensional ("2D") CMOS array with a typical size of the pixel array being on the order of 752×480 pixels or 1280×1024 pixels. The illumination-receiving pixels of the sensor array 100 define a sensor array surface 101. The sensor array 100 advantageously may be secured to the PC board 30 for stability. As used herein the term sensor array and sensor array surface may be used interchangeably, i.e., when the sensor array 100 is referred to as being in a certain orientation that is to be understood to imply that the sensor array surface 101 is in that orientation.

Figure 3:
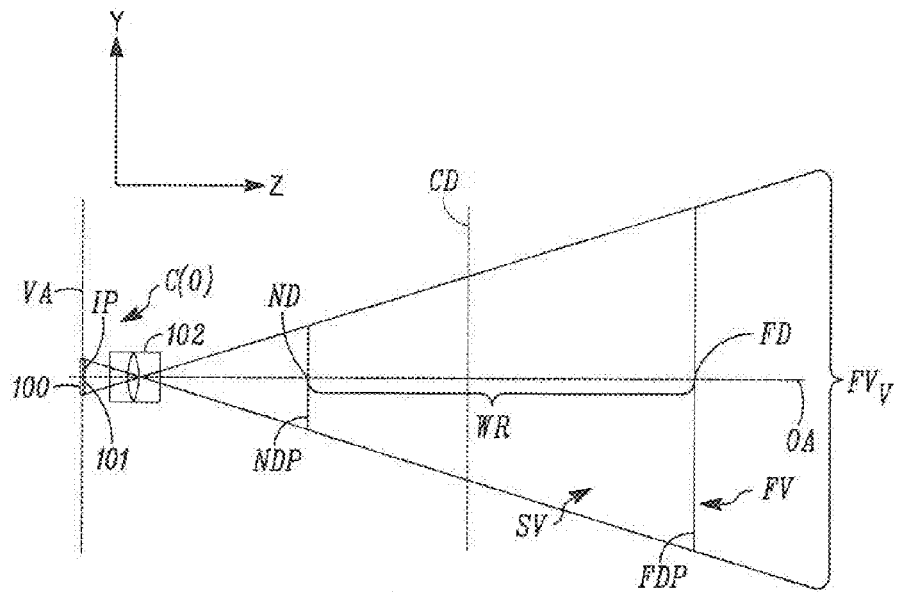
FIG. 3 is a schematic two dimensional side view representation of a camera assembly wherein a sensor array of the camera assembly is orthogonal to an optical axis of an imaging lens assembly resulting in a scanning volume that is symmetric with respect to the optical axis.
Figure 3A:
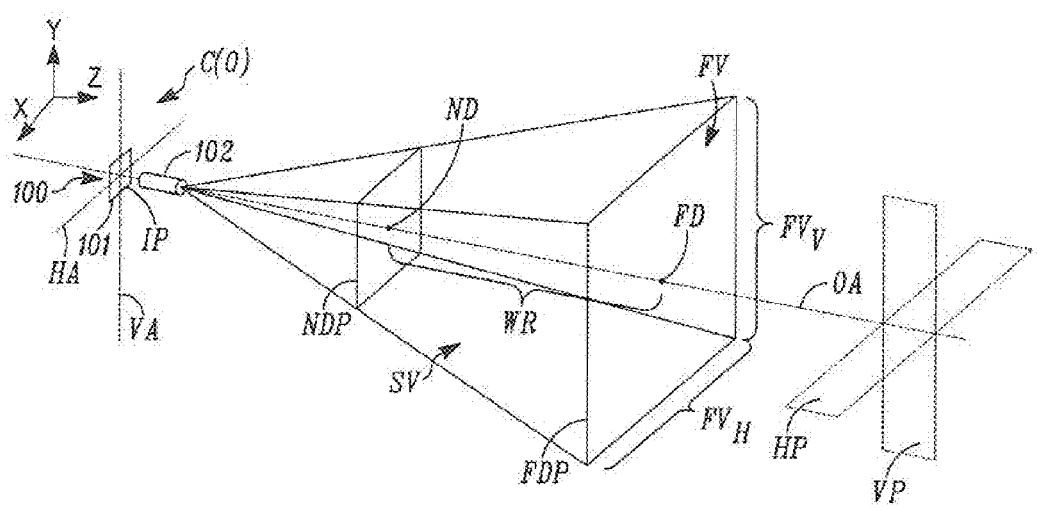
FIG. 3A is a schematic three dimensional representation of the camera assembly of FIG. 3.

Conventionally, for the camera assemblies C, the sensor array 100 is oriented so that the sensor array surface 101 is substantially perpendicular to an optical axis OA of an imaging lens assembly 102 (as shown schematically in FIG. 2 for camera assembly C1 and as shown in FIGS. 3 and 3A) That is, a z axis that is perpendicular to the sensor array surface 101 would be substantially parallel to the optical axis OA of the imaging lens assembly 102. In the present disclosure, as will be discussed below, for at least one camera assembly of the plurality of camera assemblies C, the sensor array 100 will be tilted along at least one axis so as to be non-orthogonal with respect to the optical axis OA of the imaging lens assembly 102. The pixels of the sensor array surface 101 are disposed in an orthogonal arrangement of rows and columns of pixels.

The reader 10 includes the imaging system 15, the memory 54 and a power supply 58. The power supply 58 is electrically coupled to and provides power to the circuitry 18 of the reader 10. Optionally, as noted above, the reader 10 includes the illumination system 40 which provides illumination to illuminate the desired imaging field DIF to facilitate obtaining an image 12' of a target bar code 12 that has sufficient resolution and clarity for decoding.

For each camera assembly C1-C6, electrical signals are generated by reading out of some or all of the pixels of the sensor array 100 after an exposure period generating the gray scale value digital signal 48. This occurs as follows: within each camera, the light receiving photosensor/pixels of the sensor array 100 are charged during an exposure period. Upon reading out of the pixels of the sensor array 100, an analog voltage signal is generated whose magnitude corresponds to the charge of each pixel read out. The image signals 48 of each camera assembly C1-C6 represents a sequence of photosensor voltage values, the magnitude of each value representing an intensity of the reflected light received by a photosensor/pixel during an exposure period.

Processing circuitry of the camera assembly, including gain and digitizing circuitry, then digitizes and coverts the analog signal into a digital signal whose magnitude corresponds to raw gray scale values of the pixels. The series of gray scale values GSV represent successive image frames generated by the camera assembly. The digitized signal 48 comprises a sequence of digital gray scale values typically ranging from 0-255 (for an eight bit A/D converter, i.e., $2^8$=256), where a 0 gray scale value would represent an absence of any reflected light received by a pixel during an exposure or integration period (characterized as low pixel brightness) and a 255 gray scale value would represent a very intense level of reflected light received by a pixel during an exposure period (characterized as high pixel brightness). In some sensors, particularly CMOS sensors, all pixels of the pixel array are not exposed at the same time, thus, reading out of some pixels may coincide in time with an exposure period for some other pixels.

As is best seen schematically in FIG. 2, the digital signals 48 are received by the bus interface 50 of the image processing system 15, which may include the multiplexer 52, operating under the control of an ASIC 60, to serialize the image data contained in the digital signals 48. The digitized gray scale values of the digitized signal 48 are stored in the memory 54. The digital values GSV constitute a digitized gray scale version of the series of image frames IF1-IF6, which for each camera assembly C1-C6 and for each image frame is representative of the image projected by the imaging lens assembly 102 onto the pixel/sensor array 100 during an exposure period. If the field of view FV of the imaging lens assembly 102 includes the target bar code 12, then a digital gray scale value image 12' of the target bar code 12 would be present in the digitized image frame.

The decoding circuitry 24 then operates on selected image frames and attempts to decode any decodable image within the image frames, e.g., the imaged target bar code 12'. If the decoding is successful, decoded data 62, representative of the data/information coded in the target bar code 12 may then be processed or output via a data port 64 to an external computer H (shown as 70 in FIG. 2) which also may communicate data to the reader 10 to be used in reprogramming the cameras used to detect objects. A successful decode can also be displayed to a user of the reader 10 via a display output 66. Upon achieving a good read of the target object 14, such as a target barcode or signature was successfully imaged and decoded, the speaker 46 and/or the indicator LED 44 may then be activated by the reader circuitry 18 to indicate to the user that the target bar code 12 has successfully read.

Depth of Focus/Field of View—Scanning Volume

As noted previously, in the imaging system 15 of the present disclosure, for at least one camera assembly of the plurality of camera assemblies C1-C6 of the reader 10, a sensor array 100 of the camera assembly is non-orthogonal with an optical axis OA of an imaging lens assembly 102 of the camera assembly such that an imaging or scanning volume SV of the camera assembly is non-symmetric with respect to the optical axis OA of the imaging lens assembly 102 resulting in the scanning volume SV for the camera assembly including either: 1) a greater portion of the desired imaging field DIF than would be case if the sensor array 100 and the optical axis OA were orthogonal and the scanning volume SV were symmetric with respect to the optical axis OA; and/or 2) provides imaging coverage of a portion or region of the desired imaging field DIF that otherwise would not be imaged if the scanning volume SV of the camera assembly was symmetric with respect to the optical axis OA, that is, a scanning volume of the camera assembly with the non-orthogonal sensor array—optical axis includes a portion of the desired imaging field DIF that otherwise would not be imaged if all of the imaging camera assemblies were conventional camera assemblies with the sensor array orthogonal to the imaging lens assembly and a symmetric scanning volume.

Conventional, Orthogonal Camera Assembly C(o)

Referring to FIGS. 3 and 3A, a conventional camera assembly C(o) (for camera assembly—orthogonal) includes a sensor array 100 and an imaging lens assembly 102. An optical axis OA of the imaging lens assembly is substantially orthogonal to the sensor array light receiving pixel surface 101. The imaging lens assembly 102 is characterized by a field of view FV and a working range or depth of field WR. The field of view FV is two dimensional and includes a horizontal field of view FVH and a vertical field of view FVV. The area within the field of view FV is projected by the imaging lens assembly 104 onto the sensor array surface 101 of the camera assembly C(o). The sensor array surface 101 defines a sensor or image plane IP of the camera assembly C(o). Depending on the desired optical characteristics, size, density and reflectivity of the target bar code 12 being read, lighting conditions, etc., the imaging lens assembly 102 may comprise a single lens supported in a lens holder (as shown schematically in FIG. 3) or a plurality of lenses and/or apertures supported in a lens holder.

The field of view FV is often referred to in angular terms, for example, a field of view that is 30° in the horizontal direction and 20° in the vertical direction would indicate the extent of the field of view FV projected onto a horizontal and vertical axis HA, VA of the sensor array 100. Alternately, the field of view FV can be expressed as a width measurement and a height measurement of the field of view FV at a given distance in front of (in the direction z) the imaging lens assembly 102 or the field of view can be expressed as a diagonal or hypotenuse measure of the field of view at a given distance in front of the imaging lens assembly. A vertical extent of the field of view FV is schematically shown in FIG. 3, while both the vertical and horizontal extent of the field of view FV are shown in FIG. 3A.

The working range WR of the camera assembly C(o) is defined by near distance ND and far distance FD limits over which a target bar code of a given size and density positioned within the field of view FV can be read, that is, successfully imaged and decoded. The scanning volume SV refers to the space or volume within the field of view FV between near and far distance limits ND, FD of the working range WR. A conjugated distance CD to the sensor or image plane IP, which is a best focus distance forward of the imaging lens assembly 102 for imaging, is shown in FIG. 3 and falls between the near and far distance limits ND, FD. The image plane IP is the best focus distance rearward of the imaging lens assembly 102 where the best focused image is found. The sensor array surface 101 is disposed substantially coincident with the image plane IP.

In a conventional camera assembly C(o), the working range WR does not vary substantially over the field of view FV. Stated another way, at the far distance FD of the working range WR, as can be seen in FIGS. 3 and 3A, the field of view FV comprises a substantially flat plane FDP (near distance plane) that is perpendicular to the optical axis OA of the imaging lens assembly 102. Similarly, at the near distance ND of the camera assembly C, the field of view FV also comprises a substantially a flat plane NDP (far distance plane) that is perpendicular to the optical axis OA of the imaging lens assembly 102.

In a conventional camera assembly C(o), the scanning volume SV is symmetric about the optical axis OA, i.e., if one were to cut a horizontal plane (shown schematically as HP in FIG. 3A) though the scanning volume SV, the portion of the scanning volume above and the portion of the scanning volume below the horizontal plane would be substantially identical in size and shape. Similarly, in a conventional camera assembly C(o), if one were to cut a vertical plane (shown schematically as VP in FIG. 3A) though the scanning volume SV, the portion of the scanning volume to the left of the vertical plane and the portion of the scanning above and the portion of the scanning volume below the vertical plane would be substantially identical in size and shape.

Conventional camera assemblies C(o) with symmetric scanning volumes are suitable for most camera assemblies of the multicamera reader 10, for example, where the camera assembly is not intersected and directed by a fold mirror and/or where the entirety of the scanning volume SV of the camera assembly is within or substantially within the desired imaging field DIF of the reader 10.

However, a conventional camera assembly C(o) may not be optimal for the reader 10 if, for example, given the position and orientation of the camera assembly and its intersection and direction by one or more fold mirrors M, the resulting scanning volume SV of the camera assembly may have a substantial portion of the scanning volume outside the desired imaging field DIF. Also, a conventional camera assembly may not be optimal for the reader 10 if, for example, there is a portion of the desired imaging field DIF that is not being imaged be any of the other camera assemblies C and thus a non-orthogonal camera assembly needs to be employed to obtain imaging in the portion of the desired imaging field DIF that otherwise would not be imaged.

Figure 4:
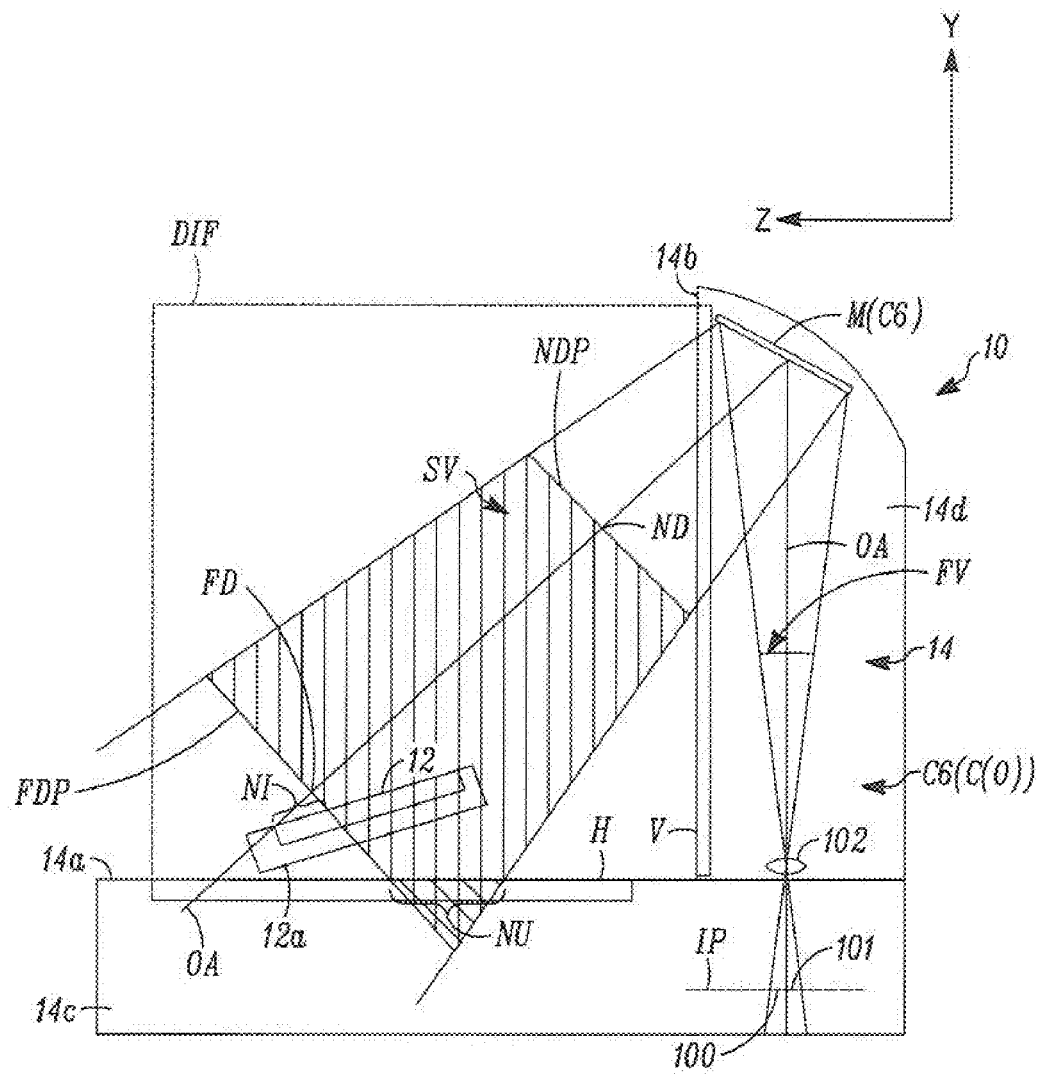
FIG. 4 is a schematic side view of the camera assembly of FIG. 3 disposed in a housing of the multicamera imaging-based reader of FIG. 1 having its field of view directed by a fold minor through a vertical presentation window of the reader and schematically illustrating a scanning volume of the camera assembly.

These shortcomings with conventional camera assembly C(o) not being optimal from a scanning volume point of view with respect to a desired imaging field DIF is schematically illustrated with regard to a specific camera assembly, namely, camera assembly C6 of the reader 10. As can be seen in FIG. 4, camera assembly C6 includes a sensor array 100 with the sensor array surface 101 being orthogonal to an optical axis OA of the imaging lens assembly 102. The field of view of camera assembly C6 is directed vertically upwardly toward the fold minor M(C6). Prior to intersecting the fold minor M(C6), the optical axis OA is substantially parallel to the vertical presentation window V and the sensor array 100 is substantially parallel to the horizontal presentation window H. Upon intersecting the mirror M(C6), the field of view FV is directed forwardly (in the direction z) through the vertical window V. The working range WR and scanning volume SV extends between the near distance plane NDP and the far distance plane FDP, both of which are orthogonal to the optical axis and the scanning volume SV is symmetric with respect to the optical axis OA.

A target object 12a is presented for reading the target bar code 12. Unfortunately, the user has oriented the target object 12a such that the target bar code 12 is on an upper surface of the object, facing away from the horizontal presentation window H. Because the target object 12a is below the target bar code 12, the target object 12a effectively blocks those camera assemblies that have their fields of view projected upwardly through the horizontal window H from imaging the target bar code 12. As stated previously, it is desired that any target bar code brought within the desired imaging field DIF of the reader 10 at any desired distance along the optical axis OA should be able to be successfully imaged and decoded, regardless of its orientation within the desired imaging field. Stated another way, the working range of a camera assemblies C should be extended or reoptimized in such a way to reach the target bar code 12 and provide imaging of the target bar code at all possible locations of the target bar code within the desired imaging field DIF.

Because the scanning volume SV of camera assembly C6 is symmetric with respect to the optical axis OA, a portion of the scanning volume labeled NU (not used) is unusable because it is below the horizontal presentation window H and thus of no use for imaging a target bar code 12 because no target bar code 12 could be positioned below an upper surface of the horizontal window. More importantly, because the scanning volume SV of camera assembly C6 is symmetric with respect to the optical axis OA, the far distance plane FDP is angled upward and away from the horizontal presentation window H, even though the target bar code 12 is entirely within the desired imaging field DIF, it cannot be imaged successfully in its entirety or successfully decoded due to the scanning volume not encompassing the entirety of the target bar code 12. As can be seen, a portion labeled NI (blurry image) of the target bar code 12 extends beyond the scanning volume SV of the camera assembly C6. Thus, the entirety of the target bar code 12 will not be imaged and, therefore, is unlikely that the target bar code 12 could be successfully decoded.

Non-Orthogonal Camera Assembly C(n)

Figure 5:
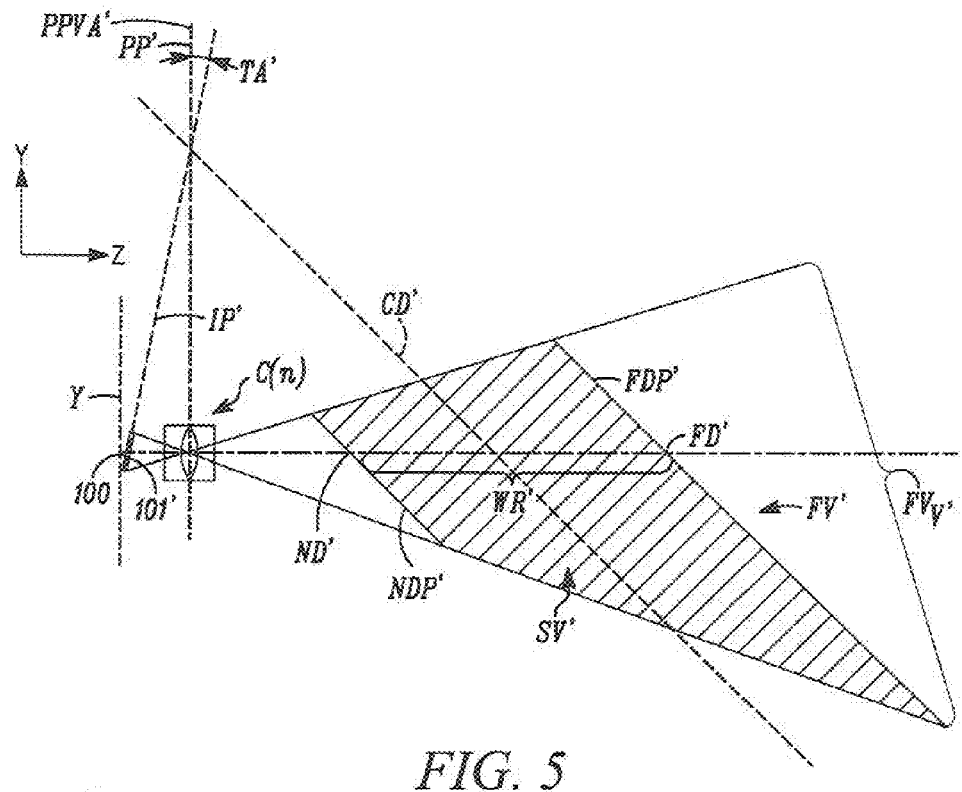
FIG. 5 a schematic two dimensional side view representation of a camera assembly of the present disclosure wherein a sensor array of the camera assembly is tilted so as to be non-orthogonal to an optical axis of an imaging lens assembly resulting in a scanning volume that is non-symmetric with respect to the optical axis.
Figure 5A:
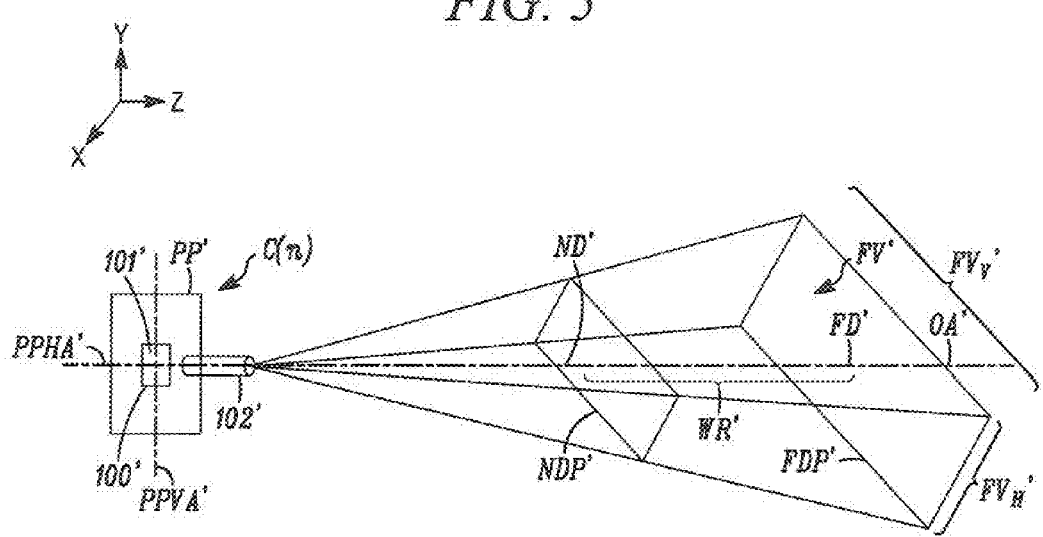
FIG. 5A is a schematic three dimensional representation of the camera assembly of FIG. 5.

The multicamera reader 10 seeks to optimize the respective scanning volumes SV of the plurality of camera assemblies C by utilizing one or more non-orthogonal, non-symmetric camera assemblies C(n) (for camera assembly—non-orthogonal) wherein the sensor array surface 101' is tilted or angled with respect to an optical axis OA' of the imaging lens assembly 102'. That is, the sensor array 100' is non-orthogonal along at least one axis with respect to the optical axis OA' of the imaging lens assembly 102'. This results, as can be seen in FIGS. 5 and 5A, in the scanning volume SV' of the camera assembly C(n) being non-symmetric with respect to the optical axis OA' along at least one axis. This phenomenon is referred to in optics as the Scheimpflug Condition, that is, if an object plane is tilted with respect to the optical axis, then the image plane is also tilted with respect to the optical axis. A set of equations associated with the Scheimpflug Condition can be used to calculate the respective image and object angles of tilt. A discussion of the Scheimpflug Condition is found in Chapter 2 (section 2.14) of a text entitled: *Modern Optical Engineering—The Design of Optical Systems*, Third Edition, by Warren J. Smith, McGraw-Hill Professional Publishing, New York, N.Y., ISBN 0-07-136360-2 (P/N 136379-3). Chapter 2 of the foregoing text *Modern Optical Engineering* is hereby incorporated herein in its entirety by reference.

A general schematic representation of a non-orthogonal camera assembly C(n) is shown in FIGS. 5 and 5A. The non-orthogonal camera assembly C(n) is advantageously utilized as camera assembly C6 in FIG. 6 to optimize the scanning volume SV', that is, to make it more congruent with the desired imaging field DIF of the reader as compared to a conventional, non-orthogonal camera assembly C(o) as described above.

Figure 6:
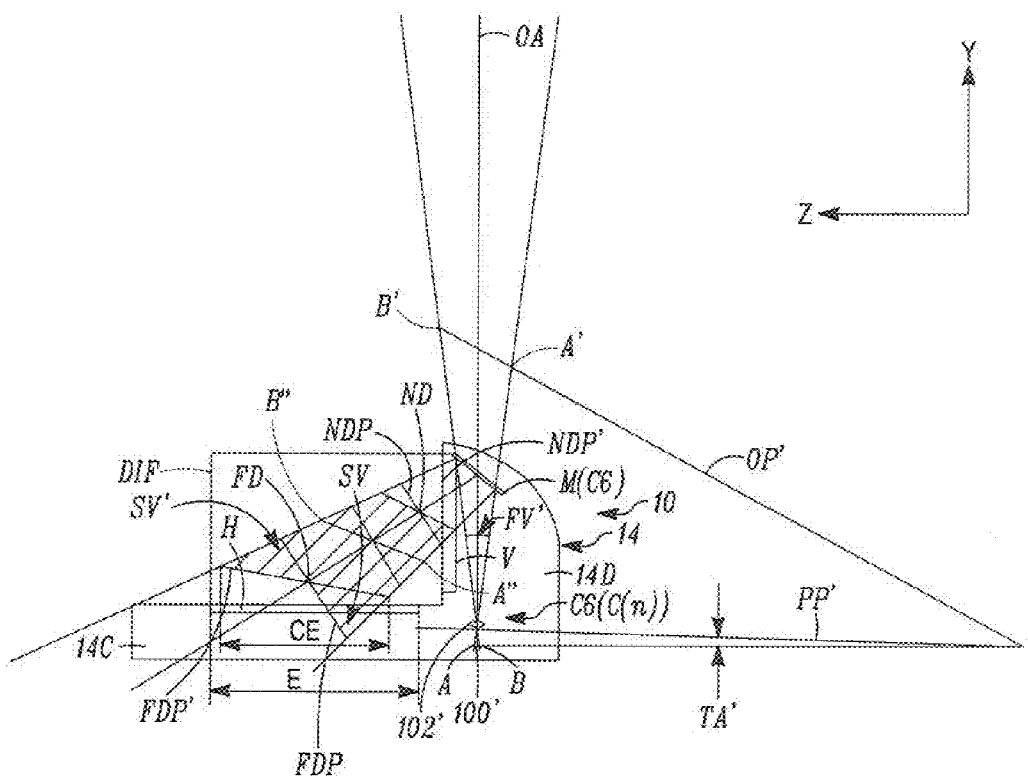
FIG. 6 is a schematic side view of the camera assembly of FIG. 5 disposed in the housing of the multicamera imaging-based reader of FIG. 1 having its field of view directed by a fold minor through a vertical presentation window of the reader and schematically illustrating a scanning volume of the camera assembly, the optical axis of the imaging lens assembly being substantially parallel to the vertical presentation window and the sensor array being tilted so as to be non-orthogonal to the optical axis.

As can be seen in FIG. 6, the camera assembly (which may be referred to as C6 or C(n) interchangeably), includes the sensor array 100' with sensor array surface 101' being non-orthogonal to an optical axis OA' of the imaging lens assembly 102'. The non-orthogonal relationship between the optical axis OA' and the sensor array surface 101' results in a non-symmetric scanning volume SV', that is, a near distance plane NDP' and a far distance plane FDP' that bound the working range or depth of field WR' are non-symmetric with respect to a horizontal plane (parallel with the x axis in FIG. 5A) coincident with the optical axis OA'.

Turning to FIGS. 5, 5A, and 6, the working range WR' of the non-symmetric camera assembly C(n) is defined by near distance ND' and far distance FD' limits over which a target bar code of a given size and density positioned within the field of view FV' can be read, that is, successfully imaged and decoded. When measured along the optical axis OA' of the imaging lens assembly 102', the near distance ND', far distance FD' and working range WR' of the non-orthogonal camera assembly C(n) is the same as the respective near distance ND, far distance FD and working range WR of the conventional camera assembly C(o).

The scanning volume SV' of the non-orthogonal camera assembly C(n) includes the space or volume within the field of view FV' between near and far distance limits ND', FD' of the working range WR'. A conjugated distance CD' to the sensor or image plane IP', which is a best focus distance forward of the imaging lens assembly 102' for imaging, is shown in FIG. 5 and falls between the near and far distance limits ND', FD'. The sensor image plane IP' is the best focus distance rearward of the imaging lens assembly 102' where the best focused image is found. The sensor array surface 101' is disposed substantially coincident with the image plane IP'.

As can be seen schematically in FIGS. 5, 5A, and 6, a principal plane PP' is a plane that is orthogonal to the optical axis OA' of the imaging lens assembly 102. As can best be seen in FIGS. 5 and 5A, a tilt angle TA' with respect to the y axis (in the forward z direction) results in an angle TA between the principal plane PP' and the sensor image plane IP'. Stated another way, the sensor array 100' is tilted forward with respect to a vertical axis PPVA' of the principal plane PP' through the optical axis OA'. This causes the near distance plane NDP' and the far distance plane FDP' to be angled rearwardly, as shown schematically in FIGS. 5 and 5A. The near and far distance planes NDP', FDP' and the scanning volume SV' are no longer symmetric with respect to a horizontal plane that is coincident with the optical axis OA', that is, a plane that passes through the optical axis OA' and is parallel to the x direction or axis shown in FIG. 5A. As can be best seen in FIG. 5, the sensor image plane IP', the principal plane PP' and the conjugated distance CD' intersect at a common point. This is a requirement of the Scheimpflug condition.

Note that in the exemplary embodiment of non-orthogonal camera assembly C(n), the sensor array 100' is not tilted with respect to a horizontal axis PPHA' of the principal plane PP', thus, the near and far distance planes NDP', FDP' and the scanning volume SV' remain symmetric with respect to a vertical plane that is coincident with the optical axis OA', that is, a plane that passes through the optical axis OA' and is parallel to the y direction or axis shown in FIG. 5A. Note that in FIG. 5A, for illustration purposes, the sensor array 100' is pivoted from the angled position it would appear in a proper 3D representation such that the sensor array 100 is schematically depicted to be in the plane of the paper. This has been done so the sensor array 100' can be seen in its entirety and the principal plane PP' is superimposed on the sensor array surface 101' to make clear that the horizontal axis PPHA' of the principal plane PP' is not tilted with respect to the sensor array 100'.

If the sensor array 100' is tilted with respect to the x axis, but not the y axis, that is, tilted with respect to the horizontal axis PPHA' of the principal plane NP' through the optical axis OA' and not tilted with respect to the vertical axis PPVA' of the principal plane PP', the scanning volume would be non-symmetric or skewed with respect to a vertical plane that is coincident with the optical axis OA' and is parallel to the y direction shown in FIGS. 5 and 5A. The scanning volume would remain symmetric with respect to a horizontal plane that is coincident with the optical axis OA'. Finally, if the sensor array 100' is tilted with respect to both the y and x axes, that is, with respect to both the vertical and horizontal axes PPVA', PPHA' of the principal plane PP' through the optical axis OA', the scanning volume would be non-symmetric or skewed with respect to both a horizontal and a vertical plane that is coincident with the optical axis OA'.

It should be understood, as one of ordinary skill in the art would understand, that depending the desired shape of a scanning volume of a non-orthogonal camera assembly C(n) in view of the desired imaging field DIF of the reader, a designer of the reader 10 would pick and choose among conventional and non-orthogonal camera assemblies and further, with respect to the non-orthogonal camera assemblies, would determine the necessary angle of tilt, if any, with respect to the orientation and angle of the tilt of the sensor array with respect to the imaging lens assembly optical axis. Stated another way, the designer would empirically determine, in view of the desired imaging field DIF of the reader, which camera assemblies of the plurality of camera assemblies would be orthogonal camera assemblies and which camera assemblies would be non-orthogonal camera assemblies and, as to the non-orthogonal camera assemblies, what the angle of tilt of the sensor array would be, if any, with respect to the horizontal axis of the principal plane through the optical axis and what the angle of tilt of the sensor array would be, if any, with respect to the vertical axis of the principal plane through the optical axis.

In the embodiment of the non-orthogonal camera assembly C(n) shown in FIG. 6, prior to a field of view FV' of the camera assembly C(n) or C6 being intersected and directed by the fold minor M(C6) through the vertical presentation window V, the optical axis OA' is substantially parallel to the vertical presentation window V and substantially orthogonal to the horizontal presentation window H. By comparison, as is shown schematically in FIG. 6, the sensor array 100' is tilted with respect to the z axis in a rearward direction with respect to the optical axis OA' such that the sensor array 100' is no longer parallel with the horizontal window H. As can be seen in FIG. 6, the object plane OP' or best focus plane intersects the optical axis at an angle represented by the line segment A'-B', as shown in the two dimensional representation shown in FIG. 6. As can also be seen in FIG. 6, the fold mirror M(C6) directs the field of view of the non-orthogonal camera assembly C(n) such that the object plane OP' line segment A', B' are projected within the desired imaging field DIF, as indicated by the line segment A"-B".

As can be seen in FIG. 6, the non-orthogonal camera assembly C(n) having a non-symmetric scanning volume SV' provides a marked improvement over the conventional camera assembly C(o) of FIGS. 3, 3A, and 4, having a scanning volume SV, with regard to the imaging field DIF of the reader 10 in at least three respects:

First, assuming the width (measured along the x coordinate) of the respective scanning volumes SV', SV is the same for both the non-orthogonal camera assembly C(n) and the conventional camera assembly C(o), as can be seen in FIG. 6, the scanning volume SV' of the non-orthogonal camera assembly C(n) occupies a greater portion within the desired imaging field DIF of the reader. Specifically, no portion of the scanning volume SV' is outside of the desired imaging field DIF, unlike the case for the conventional camera assembly C(o) wherein a portion of the scanning volume SV below the region labeled NU was below the horizontal presentation window H and, thus, outside of the desired imaging field DIF.

Second, the far distance plane FDP' of the non-orthogonal camera C(n) overlies a greater portion or extent of the horizontal presentation window H than the far distance plane FDP of the conventional camera C(o). Specifically, from a visual inspection of Figure, because the far distance plane FDP' of the non-orthogonal camera assembly C(n) does not intersect the horizontal presentation window H but rather overlies it and because the far distance plane FDP' of the non-orthogonal camera assembly C(n) is more horizontally oriented as opposed to the more vertically oriented far distance plane FDP of the conventional camera assembly C(o), it can be seen that that far distance plane FDP' of the non-orthogonal camera assembly C(n) overlies well over 50% of an extent E of the horizontal window H viewed in the z direction, specifically, when measured along the z axis, an extent CE is overlapped. By contrast, the conventional camera assembly C(o) overlies much less than 50% of the extent E of the horizontal window viewed in the z direction.

Third, the far distance plane FDP' of the non-orthogonal camera assembly C(n) is substantially coincident with a substantial portion of the horizontal presentation window H, specifically, in the z direction, over the length CE (of a total length of the E), the far distance plane FDP' is substantially coincident with the horizontal window H. Stated another way, over a portion of the horizontal window H that is well over 50% of its total area, the far distance plane FDP of the non-orthogonal camera C(n) is substantially coincident with the horizontal window H. By contrast, the far distance plane FDP of the conventional camera assembly C(o) is at a sharp angle with respect to the horizontal window H, thus, while the far distance plane FDP of the conventional camera intersects the horizontal window, it is not substantially coincident with the horizontal window H over any region or area of the horizontal window.

Stated another way, as can be seen in the comparison of scanning volume SV of the conventional camera assembly C(o) with the scanning volume SV' of the non-orthogonal camera assembly C(n) schematically depicted in FIG. 6, the scanning volume SV' of the non-orthogonal camera assembly C(n): 1) includes a greater portion of its total scanning volume SV' within the desired imaging field DIF than the portion of the total scanning volume SV of the conventional camera assembly C(o) shown in FIGS. 3, 3A, and 4; 2) includes a far distance plane FDP' that overlies a greater portion of the horizontal presentation window H than the far distance plane FDP of the conventional camera assembly C(o); 3) includes the far distance plane FDP' which is more closely adjacent to and coincident with the horizontal window H than the far distance plane FDP of the conventional camera assembly C(o), which, as can be seen in FIG. 4 is sharply angled upwardly and away from the horizontal window H; and 4) would include the entirety of the target bar code 12 as shown and oriented in FIG. 4, thus, allowing the target bar code to be imaged and successfully decoded.

Another application of the reader 10 is document capture (checks, ID cards, driver's licenses, etc.). In one exemplary embodiment, a document can be placed on the horizontal window face up or face down and one of the plurality of camera assemblies C will capture an image of the document. If the document is placed on the horizontal window H face up and it is desired for camera assembly C6 to image the document, there is a problem if camera C6 is a conventional, orthogonal camera assembly. This is because the object/document plane defined by the document is not perpendicular to the sensor image plane of the camera C6, thus, the entire upper surface of the document cannot be in focus simultaneously. Only a portion of the document upper surface can be in focus. If camera assembly C6 is a non-orthogonal camera assembly like C(n), the object plane of the camera assembly can be set so as to be, for example, substantially coincident with the horizontal presentation window H. Such a configuration of a con-orthogonal camera assembly C(n) would insure that the entirety of the document is imaged in sharp focus.

In summary, through the use of an imaging-based, non-orthogonal camera assembly, such as the camera assembly C(n) shown in FIGS. 5, 5A, as one or more of the camera assemblies C1-C6 of the reader 10, the non-symmetric shape of the camera assembly scanning volume SV' provides the ability to optimize the scanning volume SV' of each camera assembly of the plurality of camera assemblies C1-C6 of the reader 10 such that the total or effective imaging field TIF (shown schematically in FIG. 2 as the combination of the individual camera fields of view FV1-FV6 over the working range WR of each camera) of all the camera assemblies taken together more closely comports to and/or is more coincident with the desired imaging field DIF of the reader 10 and a target bar code 12 moved into the desired imaging field DIF may be imaged regardless of its orientation with respect to the horizontal and vertical presentation windows H, V.

Figure 7:
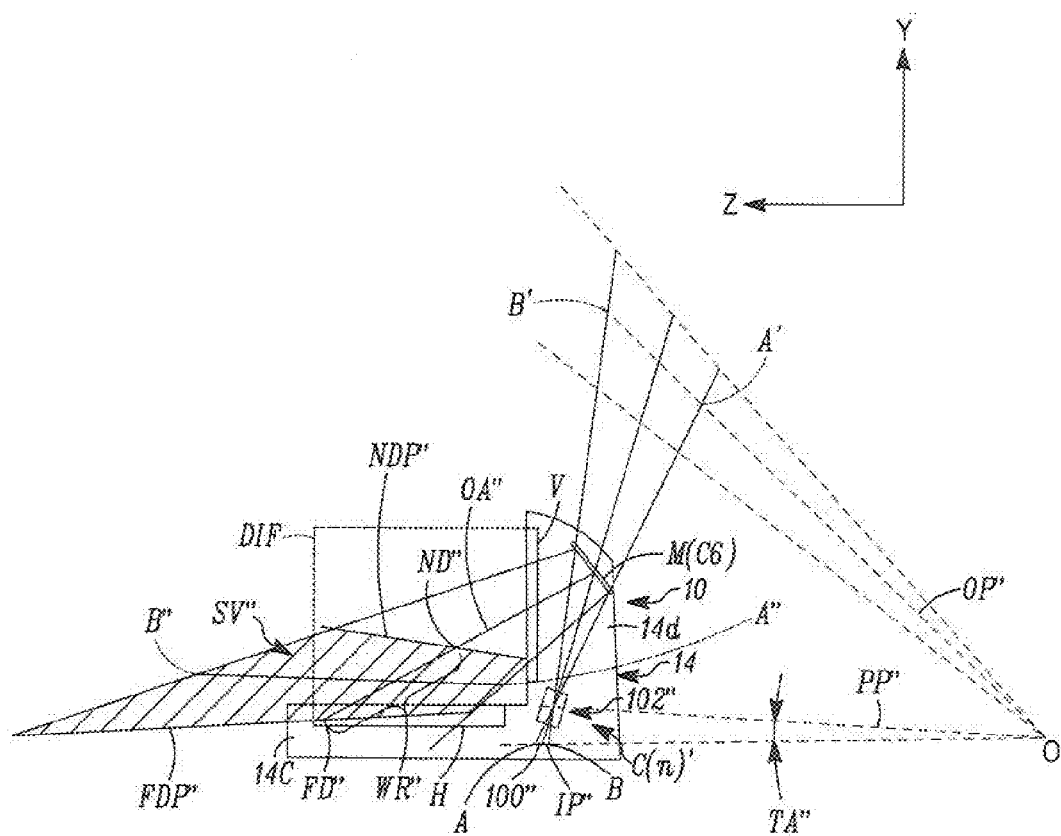
FIG. 7 is a schematic representation of an alternate exemplary embodiment of a camera assembly of the present disclosure having a sensor array that is non-orthogonal to an optical axis of an imaging lens assembly resulting in a scanning volume that is non-symmetric with respect to the optical axis, the optical axis of the imaging lens assembly being non-parallel to the vertical presentation window and the sensor array being tilted so as to be non-orthogonal to the optical axis.

FIG. 7 shows an alternate exemplary embodiment of a non-orthogonal camera assembly C(n)' of the present disclosure. In this embodiment, the imaging lens assembly 102" of the camera assembly C(n)', which is utilized as camera assembly C6 of the reader 10, is oriented to be non-parallel with respect to the vertical presentation window V and non-orthogonal with respect to the horizontal presentation window H. The sensor array 100", on the other hand, is substantially parallel with respect to the horizontal presentation window H. All the discussion regarding the prior non-orthogonal camera assembly C(n), applies equally to the present embodiment.

This embodiment of the non-orthogonal camera assembly C(n)' would be particularly appropriate in a situation where the sensor array 101" was fabricated to be surface mount with respect to the PC board 30 and, because of manufacturing limitations, could not be easily tilted with respect to the PC board, that is, the sensor array 100" was constrained to be substantially planar to the planar upper surface of the PC board. In such a case, it would be more practical to tilt the imaging lens assembly 102" with respect to the sensor array 100" such that the optical axis OA" is tilted at an angle TA" with respect to the sensor array 100". As can be seen in FIG. 7, a principal plane PP" of the imaging lens assembly 102" is oriented at a tilt angle TA" with respect to the vertical axis y and a sensor image plane IP" of the sensor array 100".

As can be seen in the schematic depiction of FIG. 7, the angle of tilt TA" between the imaging lens assembly optical axis OA" and the sensor array surface 100" causes the near distance plane NDP" and the far distance plane FDP" to be non-symmetric with respect to a horizontal plane coincident with optical axis OA" of the camera assembly C(n)' and parallel to the x axis. The near distance plane NDP" and the far distance plane FDP" define the ends of the scanning volume SV"'. The near and far distance planes NDP" and FDP" are symmetric with respect to a vertical plane coincident with the optical axis and parallel to the y axis. The near and far distance planes NDP", FDP" are substantially parallel to the horizontal presentation window H. Note that the scanning volume SV" of the non-orthogonal camera assembly C(n)' includes a non-usable portion that extends slightly below the upper surface of the horizontal presentation window H and includes another portion forward and outside of the desired imaging field DIF.

However, even with these "extraneous" portions, the non-orthogonal camera assembly C(n)' includes: 1) a greater portion of its total scanning volume SV" within the desired imaging field DIF than a portion of the total scanning volume SV of the conventional camera assembly C(o) shown in FIGS. 3, 3A, and 4; 2) includes a far distance plane FDP" that overlies a greater portion of the horizontal presentation window H than the far distance plane FDP of the conventional camera assembly C(o); 3) includes a far distance plane FDP"' which is more closely adjacent to and coincident with the horizontal window H than the far distance plane FDP of the conventional camera assembly C(o); and 4) would include within its scanning volume SV" the entirety of the target bar code 12 as shown and oriented in FIG. 4, thus, allowing the target bar code to be imaged and successfully decoded.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

We claim:

1. A multicamera imaging-based bar code reader for imaging a target bar code, the bar code reader comprising:
a housing supporting first and second transparent presentation windows, the housing defining an interior region;
an imaging system including a plurality of camera assemblies coupled to an image processing system, each camera assembly of the plurality of camera assemblies being positioned within the housing interior region and defining a field of view;
a fold mirror positioned in the housing interior region to intersect and direct a field of view of a camera assembly of the plurality of camera assemblies to pass through the first presentation window; and
wherein the camera assembly includes a sensor array and an imaging lens assembly, the sensor array being positioned with respect to the imaging lens assembly so as to be non-orthogonal with respect to an optical axis of the imaging lens assembly of the camera assembly such that a scanning volume of the camera assembly is non-symmetric with respect to the optical axis.

2. The multicamera imaging-based bar code reader of claim 1 wherein a field of view of each of the plurality of camera assemblies is different than a field of view of each other camera assembly of the plurality of camera assemblies.

3. The multicamera imaging-based bar code reader of claim 1 wherein the first and second presentation windows are substantially orthogonal.

4. The multicamera imaging-based bar code reader of claim 1 wherein the non-symmetric scanning volume of the camera assembly is exterior of the housing.

5. The multicamera imaging-based bar code reader of claim 1 wherein a far distance plane of the non-symmetric scanning volume of the camera assembly overlies at least a portion of the second presentation window.

6. The multicamera imaging-based bar code reader of claim 1 wherein a far distance plane of the non-symmetric scanning volume of the camera assembly is substantially coincident with at least a portion of the second presentation window.

7. The multicamera imaging-based bar code reader of claim 1 wherein the first presentation window is substantially vertical and the second presentation window is substantially horizontal.

8. The multicamera imaging-based bar code reader of claim 7 wherein the camera assembly is positioned in the housing interior region below the first presentation window and the field of view of the camera assembly projects upwardly, the fold mirror is positioned within the housing near an upper end of the first presentation window and directs the field view of the camera assembly outwardly and downwardly through the first presentation window.

9. The multicamera imaging-based bar code reader of claim 8 wherein the optical axis of the imaging lens assembly of the camera assembly is substantially parallel to the first presentation window and the sensor array is angled so as to be non-parallel to the second presentation window and non-orthogonal to the optical axis.

10. The multicamera imaging-based bar code reader of claim 8 wherein the sensor array is substantially parallel to the second presentation window and the imaging lens assembly is angled such that the optical axis of the imaging lens assembly is non-parallel to the first presentation window and non-orthogonal to the sensor array.

11. An imaging system for use in multicamera imaging-based bar code reader having a housing supporting first and second transparent presentation windows and the housing defining an interior region, a target object being presented to the plurality of windows for imaging a target bar code, the imaging system comprising:
a plurality of camera assemblies coupled to an image processing system, each camera assembly of the plurality of camera assemblies being positioned within the housing interior region and defining a field of view;

a fold mirror positioned in the housing interior region to intersect and direct a field of view of a camera assembly of the plurality of camera assemblies to pass through the first presentation window;

wherein the camera assembly includes a sensor array and an imaging lens assembly, the sensor array being positioned with respect to the imaging lens assembly so as to be non-orthogonal with respect to an optical axis of the imaging lens assembly of the camera assembly such that a scanning volume of the camera assembly is non-symmetric with respect to the optical axis.

12. The imaging system of claim 11 wherein the non-symmetric scanning volume of the camera assembly is exterior of the housing.

13. The imaging system of claim 11 wherein a far distance plane of the non-symmetric scanning volume of the camera assembly overlies at least a portion of the second presentation window.

14. The imaging system of claim 11 wherein a far distance plane of the non-symmetric scanning volume of the camera assembly is substantially coincident with at least a portion of the second presentation window.

15. The imaging system of claim 11 wherein a far distance plane overlaps at least a portion of the second presentation window.

16. The imaging system of claim 11 the housing first presentation window being substantially vertical and the second presentation window being substantially horizontal and wherein the camera assembly is positioned in the housing interior region below the first presentation window and the field of view of the camera assembly projects upwardly, the fold mirror is positioned within the housing near an upper end of the first presentation window and directs the field view of the camera assembly outwardly and downwardly through the first presentation window.

17. The imaging system of claim 16 wherein the optical axis of the imaging lens assembly of the camera assembly is substantially parallel to the first presentation window and the sensor array is angled so as to be non-parallel to the second presentation window and non-orthogonal to the optical axis.

18. The imaging system of claim 16 wherein the sensor array is substantially parallel to the second presentation window and the imaging lens assembly is angled such that the optical axis of the imaging lens assembly is non-parallel to the first presentation window and non-orthogonal to the sensor array.

19. A multicamera imaging-based bar code reader for imaging a target bar code, the bar code reader comprising:

a housing means supporting first and second transparent presentation windows the housing defining an interior region;

an imaging system means including a plurality of camera assembly means coupled to an image processing system, each camera assembly means of the plurality of camera assembly means being positioned within the housing interior region and defining a field of view;

a fold mirror means positioned in the housing interior region to intersect and direct a field of view of a camera assembly means of the plurality of camera assembly means to pass through the first presentation window; and wherein the camera assembly means includes a sensor array and an imaging lens assembly, the sensor array being positioned with respect to the imaging lens assembly so as to be non-orthogonal with respect to an optical axis of the imaging lens assembly of the camera assembly means such that a scanning volume of the camera assembly means is non-symmetric with respect to the optical axis.

20. The multicamera imaging-based bar code reader of claim 19 wherein a far distance plane of the non-symmetric scanning volume of the camera assembly means overlies at least a portion of the second presentation window.

* * * * *

UNITED STATES PATENT AND TRADEMARK OFFICE
CERTIFICATE OF CORRECTION

PATENT NO. : 8,118,227 B2  
APPLICATION NO. : 12/627519  
DATED : February 21, 2012  
INVENTOR(S) : Veksland et al.

Page 1 of 1

It is certified that error appears in the above-identified patent and that said Letters Patent is hereby corrected as shown below:

In Column 2, Line 11, delete "minors" and insert -- mirrors --, therefor.

In Column 2, Line 20, delete "minors" and insert -- mirrors --, therefor.

In Column 3, Line 22, delete "though" and insert -- through --, therefor.

In Column 3, Line 58, delete "minor" and insert -- mirror --, therefor.

In Column 4, Line 46, delete "minor" and insert -- mirror --, therefor.

In Column 4, Line 60, delete "minor" and insert -- mirror --, therefor.

In Column 6, Line 37, delete "minors" and insert -- mirrors --, therefor.

In Column 6, Line 48, delete "minors" and insert -- mirrors --, therefor.

In Column 11, Line 40, delete "though" and insert -- through --, therefor.

In Column 11, Line 45, delete "though" and insert -- through --, therefor.

In Column 12, Line 12, delete "minor M(C6)." and insert -- mirror M(C6). --, therefor.

In Column 12, Line 12, delete "fold minor" and insert -- fold mirror --, therefor.

In Column 15, Line 2, delete "minor" and insert -- mirror --, therefor.

In Column 19, Line 26, in Claim 16, delete "11 the" and insert -- 11 wherein the --, therefor.

Signed and Sealed this  
Eighteenth Day of December, 2012

David J. Kappos  
*Director of the United States Patent and Trademark Office*